Inventor
SAMUEL S. STOLP AND
HENRY A. BROWN.

Patented Oct. 30, 1934

1,978,916

UNITED STATES PATENT OFFICE 1,978,916

SOLENOID

Samuel S. Stolp, Louisville, Ky., and Henry A. Brown, Cleveland, Ohio

Application June 23, 1933, Serial No. 677,198

4 Claims. (Cl. 175—341)

This invention relates to improvements in solenoid construction and associated mechanism especially adapted for operating electric track switches in the electric railway field, in which the solenoid is encased in a housing of magnetic material and the windings are supported on a non-magnetic tube which in turn is carried by the housing.

The main object of our invention is to provide improved protective means for the tube on which the windings are supported and in which the plunger reciprocates under the influence of periodic energization of the windings.

Another object of this invention is to mount the plunger in bearings in such a manner that the plunger will not come in mechanical contact with the tube.

A further object of this invention is to completely seal the plunger from ingress of foreign matter which will not only protect the plunger from erosion by grit and other dirt, but also to protect it from moisture and rust, and at the same time provide lubricating means, all of which makes not only for a long life of mechanical parts, but also for efficient use of the electric energy which is applied to the solenoid.

A still further object is to mount the parts that support and seal the plunger directly on the tube and employ same for the further purpose of sealing the tube in the housing to give complete protection to the electrical windings and to make ample provision for holding the last mentioned seal during expansion and contraction which is necessarily unequal and results from a wide variation of temperature, and the different coefficients of expansion of the magnetic and non-magnetic material.

The accompanying drawing which is used to explain the improvements outlined supra, are incorporated in this specification.

Figure 1:
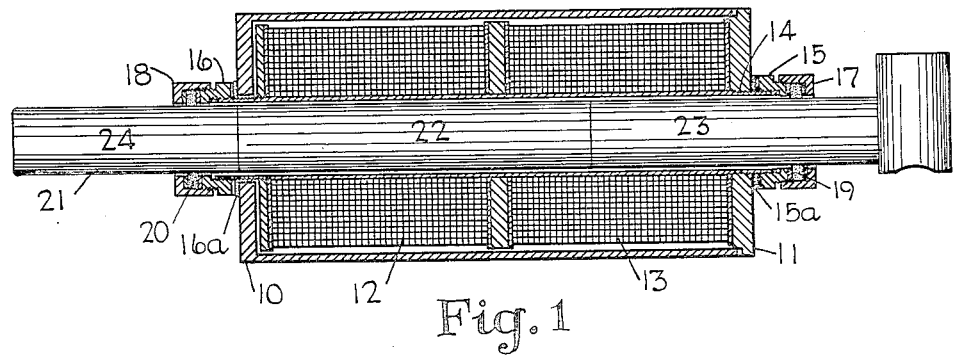
Figure 2:
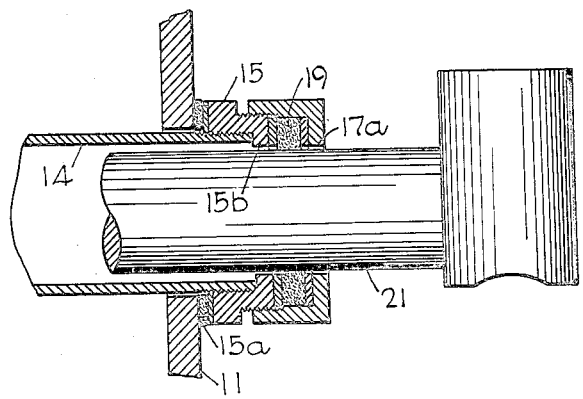
Figure 3:
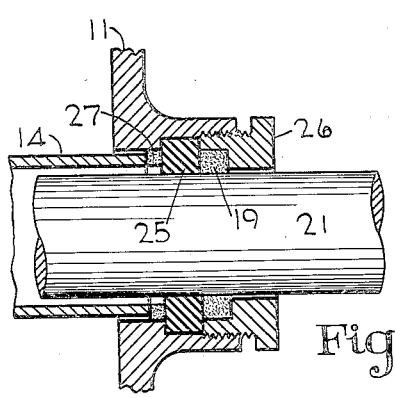

Figure 1 is a cross sectional view of the complete electro-magnet together with its center tube, seals, and a full elevational view of the associated plunger. Fig. 2 is an enlarged cross sectional view of a section of the end of the housing, tube, seals, plunger and the details of the bearing. Fig. 3 is a modification of Fig. 2.

Numeral 10 indicates a magnetic housing to which is secured, in any conventional manner, magnetic head 11 which forms a protecting shell for solenoids 12 and 13, and in which is disposed a non-magnetic tube 14, which extends beyond the end members of the shell and is fashioned with threads to receive nuts 15, 16, which are internally threaded to provide means for clamping gaskets 15a, 16a to provide an effective seal as indicated and to permit the tube and shell to freely and unequally expand and contract in response to the incident temperature change without breaking the seal. These nuts are also externally threaded to receive internally threaded shells 17, 18 in order that gaskets 19 and 20 can be securely clamped in place thereby forming substantial glands which not only seal plunger 21 but furnishes an enduring bearing and lubricant, all of which is organized for the additional feature of keeping the integral plunger absolutely in line, centrally located and out of mechanical contact with the shell and entirely independent of the shell or housing. Attention is directed to the fact that nut 15 is a duplicate of 16, while shell 17 is a duplicate of 18 which is likewise true of gaskets 19 and 20. It is also to be noted that the inner faces 15b of nut 15 and 17a of shell 17 are of a lesser diameter than center tube 14 which was selected in order that should the gaskets be neglected or become badly worn that these surfaces will serve to prevent plunger 21 from dragging on the inner surface of the center tube which has been one of the imperfections in the construction of switches as heretofore employed, in-as-much as the resulting friction prematurely destroyed all associated parts.

Plunger 21 is constructed with a central magnetic member 22, to which are securely attached non-magnetic members 23, 24 preferably of the same diameter which is not only an advantage in the production of the plunger, but in operation which permits its free movement without displacing the air or oil lying between its contour and the inner face of tube 14. Heretofore in electro-magnets of this type, in which an effort has been made to protect the conventional plunger by sealing same, provision had to be made for movement of air incident to its operation or else there would be a retardance similar to the action found in "dash pots". The space within the seals can be loaded with oil which will remain for a long period under normal operation.

In the modified structure shown in Fig. 3 are found corresponding parts to those illustrated in Fig. 1 and 2, some of which are slightly modified. It will be noted that tubing 14 extends into, but not beyond magnetic head 11, the latter being modified to receive replaceable bearing 25 which can be made of graphite metal or suitable material held in place by gland 26, which also secures packing 19 which functions the same in this structure as in the former disclosure. Between the end of tube 14 and bearing 25, packing 27 is placed and is to be of a material selected to effect a seal against the ingress of foreign matter during normal and abnormal temperatures, in other words to have sufficient elasticity to prevent the seals being broken during unequal expansion of tube 14 and housing 10.

It is through these structures and co-ordination of parts that the objects of this invention are achieved, however, further modifications, rearrangements, and substitutions can be indulged without departing from the spirit of this invention, therefore we wish to be limited only by the accompanying claims.

We claim:

1. In an electro-magnet, comprising a plunger of substantially the same diameter throughout and composed of a magnetic center section and non-magnetic end sections, a magnetic cylinder shell included in the magnetic path of the flux of said magnet, a center non-magnetic tube mounted therein and yieldingly sealed in each end of said shell by a gasket secured by closures which also carry gasket equipped bearings for said plunger, the non-magnetic sections of said plunger cooperating with said gasket equipped bearings to effectively seal the chamber established within said tube by said tube, bearings and non-magnetic end sections.

2. In an electro-magnet, comprising a plunger of substantially the same diameter throughout and composed of a magnetic center section and non-magnetic end sections, a magnetic cylinder shell included in the magnetic path of the flux of said magnet, a center non-magnetic tube mounted therein by closures which also carry gasket equipped bearings for said plunger, the non-magnetic sections of said plunger cooperating with said gasket equipped bearings to effectively seal the chamber established within said tube by said tube, bearings and non-magnetic end sections.

3. In an electro-magnet, comprising a magnetic cylinder shell included in the magnetic path of the flux of said magnet, a plunger having rod portions extending beyond the ends of said magnet, a center non-magnetic tube mounted within said shell and yieldingly sealed in each end thereof by a gasket secured by closures which also carry removable bearings for said rod portions, gaskets disposed in said closures outside of said bearings, said rod portions of said plunger cooperating with said gasket equipped bearings to effectively seal the chamber established within said tube by said tube, gaskets and rod portions.

4. In an electro-magnet, comprising a magnetic cylinder shell included in the magnetic path of the flux of said magnet, a plunger having rod portions extending beyond the ends of said magnet, a center non-magnetic tube mounted within said shell and supported in each end thereof by closures which carry removable bearings for said rod portions, gaskets disposed in said closures outside of said bearings, said rod portions of said plunger cooperating with said gasket equipped bearings to effectively seal the chamber established within said tube by said tube, gaskets and rod portions.

SAMUEL S. STOLP.
HENRY A. BROWN.